United States Patent
Romanik et al.

(10) Patent No.: US 6,990,255 B2
(45) Date of Patent: Jan. 24, 2006

(54) IMAGE DEFECT DISPLAY SYSTEM

(76) Inventors: Philip B. Romanik, 116 Parker Ave. East, West Haven, CT (US) 06516; Amy H. Muntz, 71 Grassland St., Lexington, MA (US) 02421

( * ) Notice: Subject to any disclaimer, the term of this patent is extended or adjusted under 35 U.S.C. 154(b) by 666 days.

(21) Appl. No.: 09/956,664

(22) Filed: Sep. 19, 2001

(65) Prior Publication Data
US 2003/0053713 A1 Mar. 20, 2003

(51) Int. Cl.
*G06K 9/36* (2006.01)
(52) U.S. Cl. .................. 382/284; 382/149; 382/294
(58) Field of Classification Search ............. 382/252, 382/275, 284, 287, 294, 274, 282, 149, 151, 382/254, 311; 358/540, 450, 463, 3.26, 3.27, 358/447, 461, 4; 345/634; 348/588, 606
See application file for complete search history.

(56) References Cited

U.S. PATENT DOCUMENTS

| | | | | |
|---|---|---|---|---|
| 4,829,293 A | * | 5/1989 | Schlater | 345/440.1 |
| 5,294,978 A | * | 3/1994 | Katayama | 375/240.12 |
| 5,301,026 A | * | 4/1994 | Lee | 348/584 |
| 5,459,486 A | * | 10/1995 | Iverson et al. | 345/593 |
| 5,724,454 A | * | 3/1998 | Shimazu et al. | 382/258 |
| 5,732,230 A | * | 3/1998 | Cullen et al. | 715/764 |
| 5,910,114 A | * | 6/1999 | Nock et al. | 600/437 |
| 5,966,464 A | * | 10/1999 | Kojima | 382/228 |
| 6,026,215 A | * | 2/2000 | Fantone et al. | 358/1.2 |
| 6,067,153 A | * | 5/2000 | Mizuno | 356/237.2 |
| 6,104,839 A | * | 8/2000 | Cok et al. | 382/254 |
| 6,400,845 B1 | * | 6/2002 | Volino | 382/176 |
| 6,556,775 B1 | * | 4/2003 | Shimada | 386/121 |
| 6,574,374 B1 | * | 6/2003 | Acharya | 382/257 |
| 6,831,995 B1 | * | 12/2004 | Asano et al. | 382/141 |

OTHER PUBLICATIONS

IO Industries Video Savant product brochure; http://www.ioindustries.com/media/vssdk.pdf.*

Ttvision system lets Rx company keep a steady eye on labels Food and Drug Packaging, Jul. 9, 1999. (Also http://www.xyntekinc.com/food drug.htm.*

* cited by examiner

*Primary Examiner*—Daniel Miriam

(57) ABSTRACT

A system for taking a sequence of images and converting them to a single composite image that contains the combined visual information of the defects found in the source images. The source images are aligned and manipulated, if necessary, such that they can be superimposed together. Optional image processing steps are applied to further enhance the defects. Both the number of input images and the algorithm used to combine these images can be adjusted to allow an observer to see a persistent display of the defects found in the images. Status, diagnostic and defect information, consisting of graphics and textual messages, are then applied to the composite image for display.

22 Claims, 5 Drawing Sheets

Offset Mode

Overlay Mode

IMAGE DEFECT DISPLAY SYSTEM

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Image inspection systems analyze digital images to find defects or other abnormalities. Many machine vision systems expect every object passing under the camera to be identical to every other object. Through training, these systems can detect imperfections in a product so that it can be labeled, sorted, or rejected. The data that describes the defects is usually recorded such that process improvements can be made to prevent these defects from occurring in the future. Most systems also include a video monitor to display the most recent part that was inspected. This serves as a visual check of what the process is doing. Vision systems often include graphics or other overlay information to identify any problems that were found. When another object passes under the camera, that image replaces the one on the monitor. This frozen view of each product is useful on its own to allow equipment operators to see each product. As manufacturing equipment runs faster and faster, it is difficult to view the product without this frozen view. As shown in the references, existing products sold either as a package or as components, allow the acquisition and display of images, in both realtime and playback from analog and digital storage devices. These products typically fall into one of two categories; capture and display, and capture, store, replay, and display. Although these products offer flexibility in the rate that images can be displayed, they do not provide a mechanism to display multiple images simultaneously, other than to display multiple, reduced resolution (i.e. thumbnail) images. Although these vision systems are useful, they do not allow for a visual comparison of images in realtime.

BRIEF SUMMARY OF THE INVENTION

It is therefore an object of the present invention to provide techniques for converting a number of digital images into a composite image, adding additional defect information, and displaying this image.

In one aspect of the invention, digital images are assembled into a composite image. These images can be sequential images produced by an automated inspection system or they can be images from a database of saved images. The composite image is formed via an arbitrary algorithm, although a weighted average of the input images is used in the preferred embodiment. Previously computed composite images can also be used to help highlight differences in the images or to enhance performance. The composite image is displayed in realtime to provide a visual feedback of the state of the inspection and the quality of product being imaged. This process can also be applied to previously saved images and used for later analysis.

In another aspect of the invention, the images used to compute the composite image undergo a number of transformations before the composite image is computed. Using information supplied by the image inspection system or computed locally, the images are adjusted by size and orientation, such as translation, rotation, scaling, and skew such that the images are aligned with respect to one another. Images can also be normalized to adjust image brightness, contrast, and color to allow them to be manipulated or to better view the images. Images can further be modified by reducing their pixel depth to also better view the composite image and defects.

In yet another aspect of the invention, the composite image produced is not always a pixel-for-pixel overlay of many source images. The composite image is instead translated slightly from one image to the next such that defects become easier to see when displayed.

Another aspect of the invention is that the composite image can be further annotated with known defect information supplied by the automated inspection system. Annotation can include text, highlighting regions where defects are found, or highlighting the defects themselves. With this technique it becomes easy to see and characterize defective areas in the image, missing portions of the image, and extra or unexpected features in the image.

DETAILED DESCRIPTION OF THE INVENTION

Figure 1:
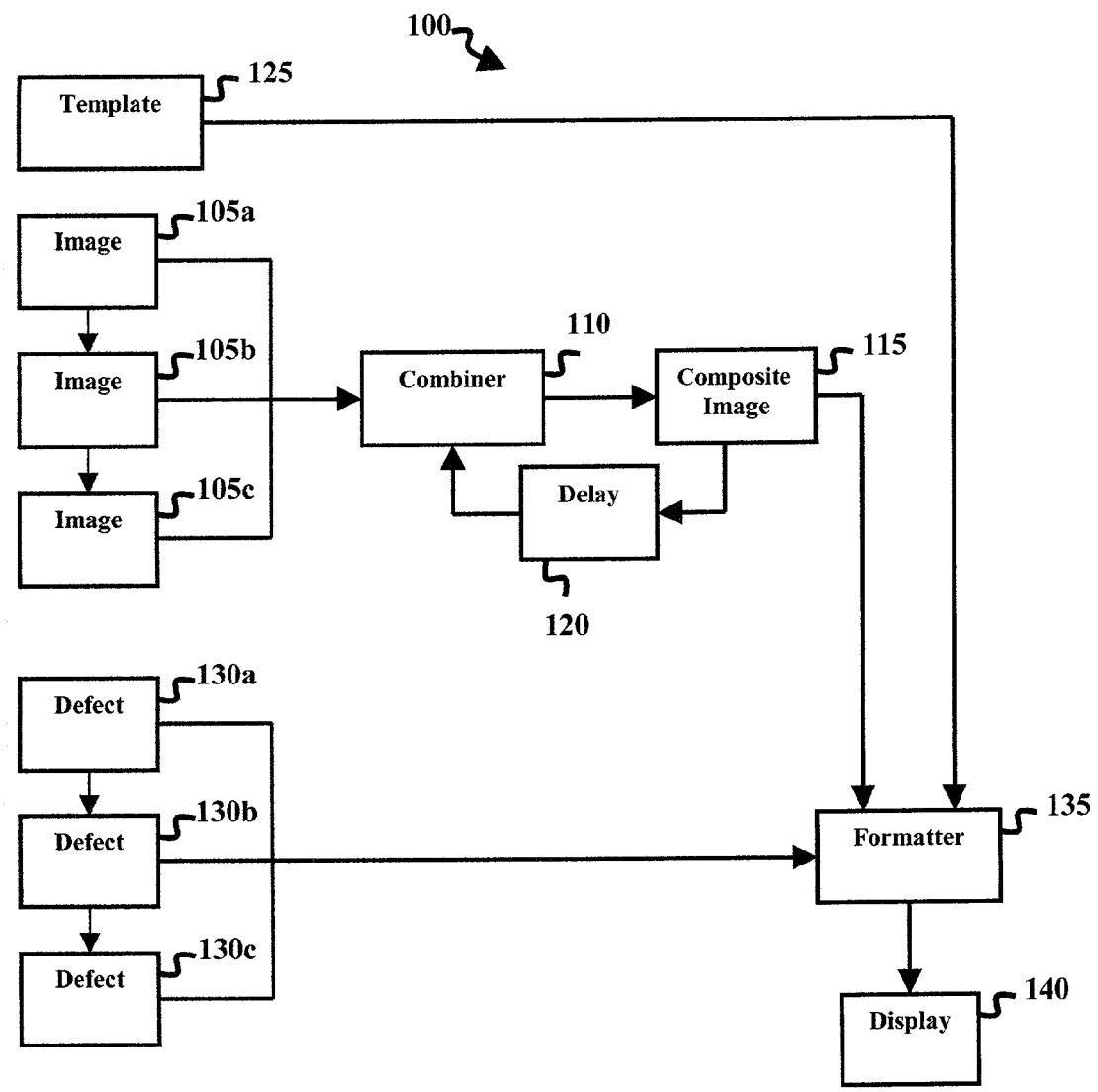
FIG. 1 is a block diagram illustrating a system according to the invention for computing and displaying a composite image from multiple input images.

Those of ordinary skill in the art will realize that the following description of the present invention is illustrative only and not in any way limiting. Other embodiments of the invention will readily suggest themselves to such skilled persons having the benefit of this disclosure. The various features of the invention will now be described with respect to the figures, in which like parts are identified with the same reference characters.

FIG. 1 is a block diagram illustrating a system 100 according to the invention for generating composite images from one or more source images for display. System 100 processes a multiplicity of images, e.g. image's 105a, 105b, 105c, referred to collectively as images 105. Images 105 are produced by an image inspection system and are either used directly from the inspection system or indirectly from an image database. In the preferred embodiment, these images are sequential images generated by the image inspection system. In the example shown in FIG. 1 where 3 images are used, image 105a represents the image from inspection N, image 105*b* represents the image from inspection (N−1), and image 105*c* represents the image from inspection (N−2). When the next image is available from the image inspection system, image 105*a* represents the image from inspection (N+1), and image 105*b* represents the image from inspection N, and image 105*c* represents the image from inspection (N−1). Each image represents the visual state of the object under inspection. However, this sequence of images can be obtained in other ways, such as sub-sampling the images to take every Nth image or restricting images to those that fit some criteria determined by the image analysis system. The combiner 110 uses images 105 to produce a composite image 115. Combiner 110 can perform any arbitrary transformation on images 105. In the preferred embodiment of the invention, combiner 110 computes a weighted average of images 105 with the weights selected from a series of pre-programmed profiles. Combiner 110 can also utilize previous values of composite image 115 via delay 120. Delay 120 is a simple FIFO whose size depends on the algorithm chosen by combiner 110. In the preferred embodiment, delay 120 is a single stage FIFO such that the composite image from one iteration can partially be based on the composite image from the previous iteration.

The composite image 115 produced by combiner 110 is intended to be a visual check of the inspection process. Defects found in images 105 will tend to persist in the composite image, depending on the number of images input to combiner 110 and the weighting function used. It can be viewed directly on a display or formatter 135 can further process it. Formatter 135 can take additional information provided by the automated inspection system to enhance the usefulness of the displayed image. For example, if the inspection system is trying to compare an image verses a desired template 125, the formatter can perform a comparison operation with the composite image 115. In the preferred embodiment the formatter will subtract the template image 125 from the composite image 115, producing a difference image. In this case, the image will use shades of gray, false color, or true color to show the differences between the template 125 and composite 115. Defect information, e.g. defects 130*a*, 130*b*, 130*c*, referred to collectively as defect 130, is optionally supplied by the automated inspection system. Defects correspond to a specific image and specify regions, specific pixels, or general information regarding the state and location of defects in the image. According to FIG. 1, defect 130*a* corresponds to image 105*a*, defect 130*b* corresponds to image 105*b*, and defect 130*c* corresponds to image 105*c*. Even if the image 105 contains no defects, defect 130 can still contain quantitative and qualitative information about the image. Formatter 135 uses defect 130 to further highlight and annotate the composite image 115 which allows the user to observe the state and quality of the object under inspection. The output of formatter 135 is then sent to display 140 for viewing.

Figure 2:
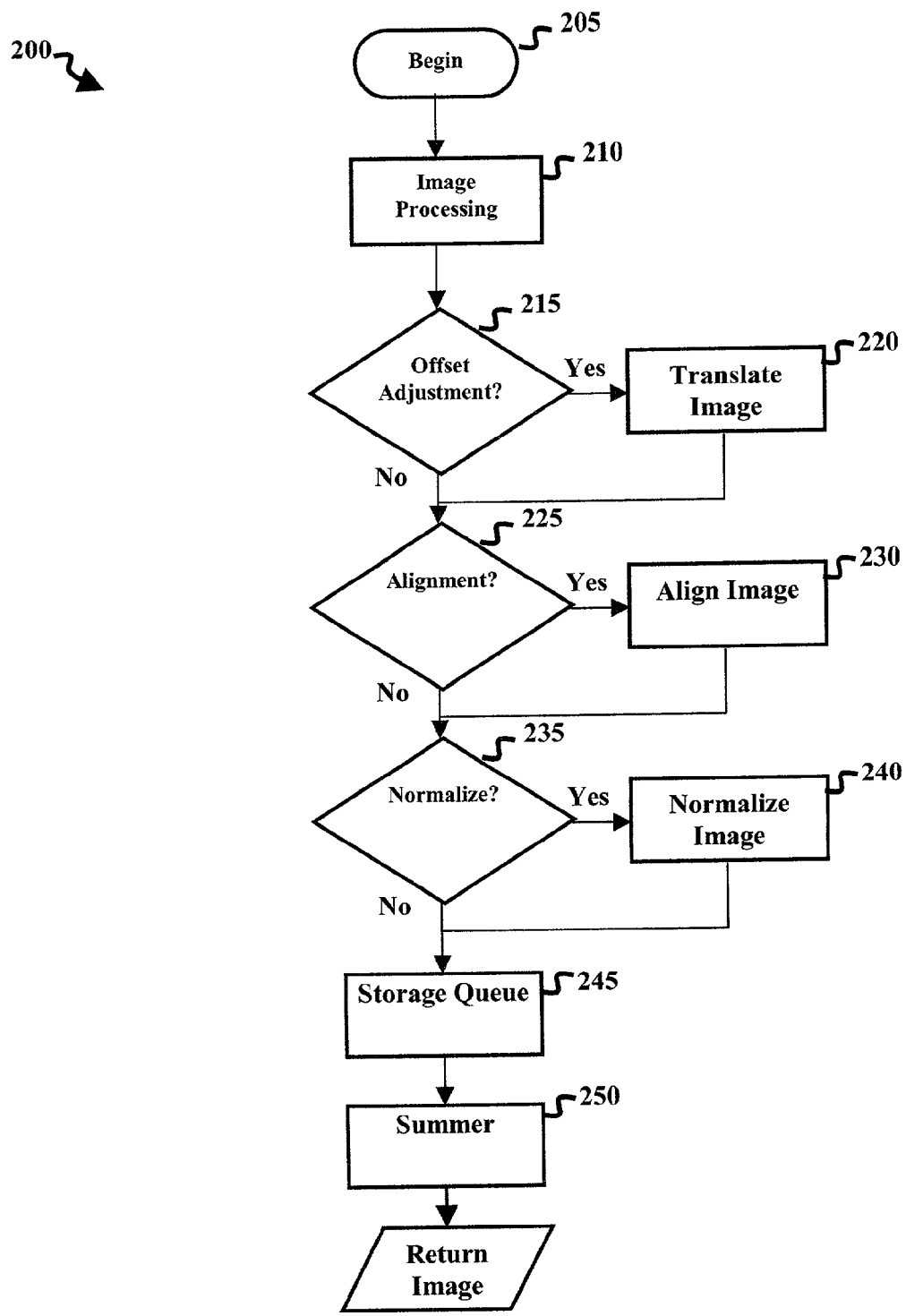
FIG. 2 is a flow chart illustrating a method according to the invention describing how the combiner computes a composite image from multiple input images.

FIG. 2 is a flow chart illustrating a method 200 according to the invention for describing how the combiner computes a composite image from multiple input images. This process is performed inside the combiner 110. The process of computing a composite image begins in step 205. This will be initiated when a new set of input images 105 is available. In step 210, image processing is optionally applied to the images to help show any defects. This can consist of zero or more steps applied sequentially to each image. In the preferred embodiment of the invention, the methods selected depend upon the expected type of defects. For example, to highlight dimensional, surface and boundary defects, one or more high-pass filters are applied to highlight edges in the images. The user can change the number and types of image processing steps, and parameters in realtime until the desired amount of processing is found.

In step 215, a check is made to see if any images must be shifted such that the objects in each image are colinear. In step 220, any necessary image translation is performed. In the preferred embodiment, this step is only necessary for the most recent image 105*a* since a copy of the other translated images is maintained, if necessary, inside combiner 110. In the preferred embodiment, this translation will be done with sub-pixel accuracy, using bilinear interpolation to shift the image data.

In step 225, a check is made to see if any images must be aligned with respect to one another. This step is necessary if the movement of the objects in images 105 is caused by more than just translation. Information regarding image alignment can be derived from the images 105 although in the preferred embodiment of the invention, alignment information is provided by the image inspection system. In step 230, any necessary image alignment is performed. In the preferred embodiment, this step is only necessary for the most recent image 105*a* since a copy of the other aligned images is maintained, if necessary, inside combiner 110. The system can choose from a plurality of methods to align the image, but in the preferred embodiment, a 6 degree of freedom transformation with bilinear interpolation is used. If image alignment and translation is necessary, as opposed to just translation, steps 215 and 220 are bypassed and step 230 performs alignment of all 6 degrees of freedom (x translation, y translation, rotation, skew, aspect ratio, and scale).

In step 235, a check is made to see if any images should be normalized; i.e., adjustments to image brightness, contrast, and color to improve the visual display of the composite image 115. For inspection systems where lighting and variation in part brightness is tightly controlled, this step is not necessary. In step 240, the image is normalized. In the preferred embodiment of the invention, the average light level in one or more rectangular regions of interest for each color channel of the image is adjusted in a linear fashion to a predefined level. This approach prevents lighting variation from creating distracting visual artifacts in the composite image that can be misconstrued as an anomaly. Image normalization can also include reducing the dynamic range, i.e. the pixel depth, of each image. This transformation can include but is not limited to, converting a color image to a gray-scale image, reducing the pixel depth for each channel of a multi-channel image, or reducing the pixel depth of a gray-scale image. Reducing the pixel depth has a number of benefits, including enhancing performance, and creating composite images that makes it easier to visually show defects. In the preferred embodiment of the invention, the pixel depth of any channel with a pixel depth of 8 bits or larger is reduced by either 2 bits, or to an 8 bit image.

In step 245, the transformed representation of each image is maintained in a queue. When a new image is stored in the queue, the oldest image is removed. If no size, alignment or normalization is necessary, the images stored in the queue are identical to the images 105 supplied by the image analysis equipment.

In step 250, the images in the storage queue, along with previous composite images from delay 120, are combined to form the current composite image 115. Any algorithm may be employed to combine the images, although a weighted average of the input images is used in the preferred embodiment. When the composite image 115 is computed by the summer in step 250, this signals the end of method 200. The weights used for each image in step 250 can be positive or negative. Typically, positive weights are used when the inputs to the summer are images produced by the image inspection equipment. Negative weights are typically used when the summer also includes previous composite images in its computation. In this case, the weights applied to the previous composite images are positive while the weights given to the input images 105 are negative.

Figure 3:
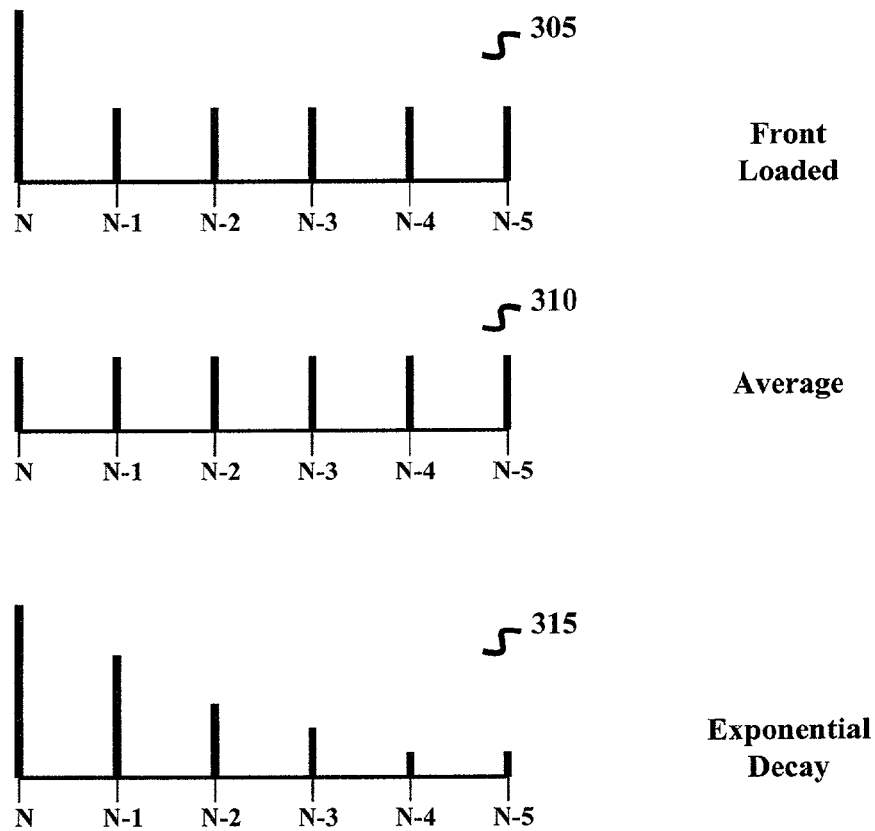
FIG. 3 describes some common weighting functions for the combiner used in the preferred embodiment of the invention.

FIG. 3 shows some examples of the weighting functions employed by step 250 in the preferred embodiment of the invention. Each diagram shows the relative weight each image in a multiple image sequence receives to compute the composite image 115. The number of samples used in the weighted average is application dependent. Diagram 305 shows a front-loaded weighting function, where the largest weight is applied to the most recent image (image N). This weighting will emphasis defects in the most recently provided image, image N, as compared to the other images. Computing the composite image can be optimized, if necessary, by manipulating the previously computed composite image with three steps:

1. Remove the contribution from the oldest image (N−5 in diagram 305).
2. Remove part of the contribution from the most recent image (N in diagram 305) such that its weight is the correct value for image N−1.
3. Add the contribution of the newly available image. This new image now becomes image N.

Diagram 310 shows a weighting function with equal values creating an average composite image. This weighting function is best applied in cases when defects tend to happen in clusters, since a single defect has a smaller effect on the composite image. A single defect becomes harder to detect because its effect will be averaged with images that do not contain that defect, making it more difficult to see. Computing the composite image can be optimized, if necessary, by manipulating the last composite image with two steps:

1. Remove the contribution from the oldest image (N−5 in diagram 310).
2. Add the contribution of the newly available image. This new image now becomes image N.

Diagram 315 shows an exponential weighting function where the weights applied to the images rapidly decreases towards zero. When the number of images used to compute the composite image is fairly small, the exponential weighting function produces results similar to those seen with the front loaded function shown in diagram 305. When the sample size becomes larger this weighting function combines the best results of diagram 305 (showing a single defect) and diagram 310 (highlighting recurring defects).

Figure 4:
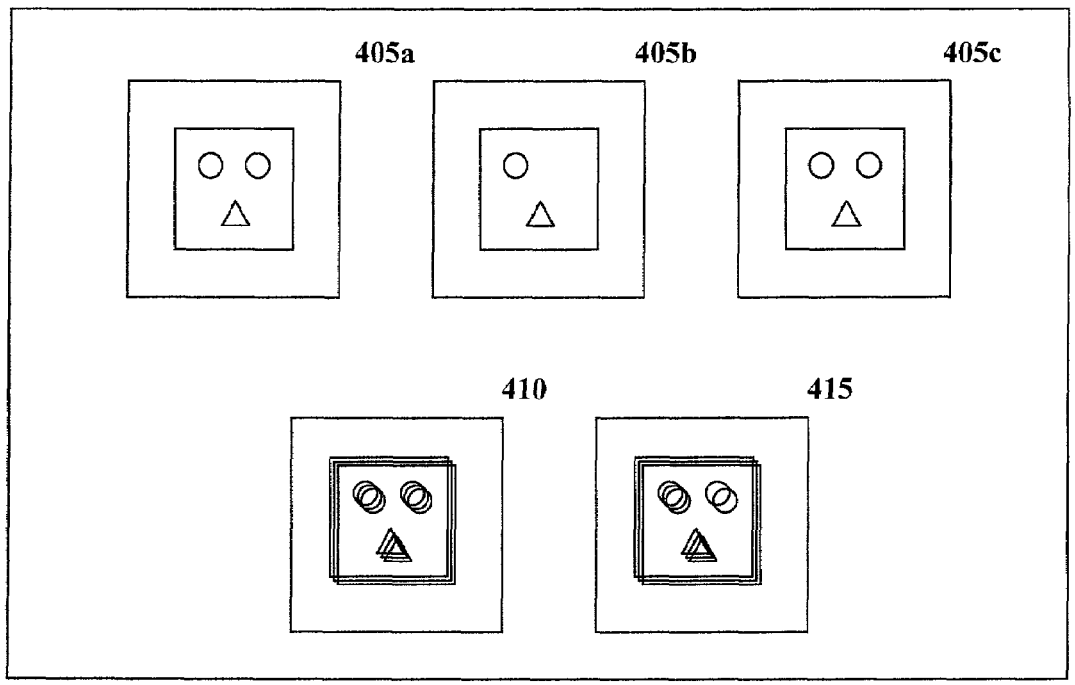
FIG. 4 illustrates the composite images generated by the combiner in both overlay mode and offset mode.
Figure 4:
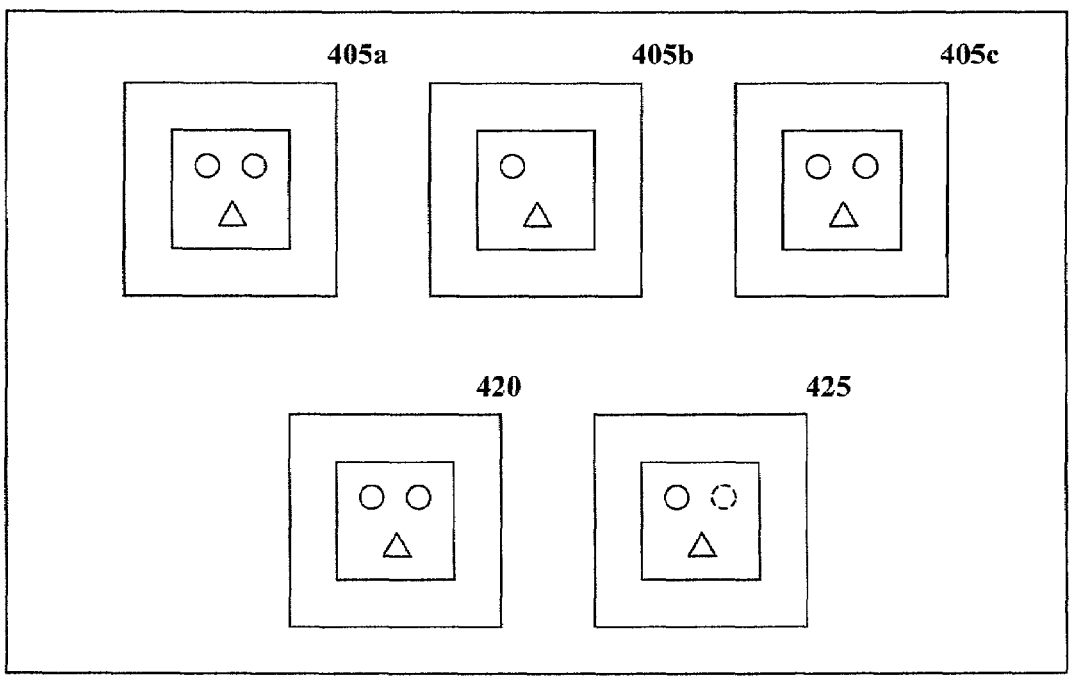

In the preferred embodiment of the invention, the summer 250 of method 200 operates in either offset mode or overlay mode. An example of these modes is shown in FIG. 4. In overlay mode, the composite image is computed by overlaying each image, using a predetermined weight, on top of one another. In FIG. 4, images 405*a*, 405*b*, and 405*c*, represent the input images used to construct the composite image. Images 405*a* and 405*c* contain no defects while image 405*b* is missing a feature. Image 420 shows how the composite image will appear when no defects are found. Image 425 shows how the composite image will appear when the images 405*a*, 405*b*, and 405*c* are used.

FIG. 4 also shows how the system works when in offset mode. In this mode, the composite image is computed by shifting each image slightly when they are combined. This shift can be any value although a uniform shift in X and Y is typically used. Image 410 shows how the composite image will appear when no defects are found. Image 415 shows how the composite image will appear when the images 405*a*, 405*b*, and 405*c* are used. The x-shift and y-shift amounts can be tuned to the application such that the expected defects will become easier to see.

Figure 5:
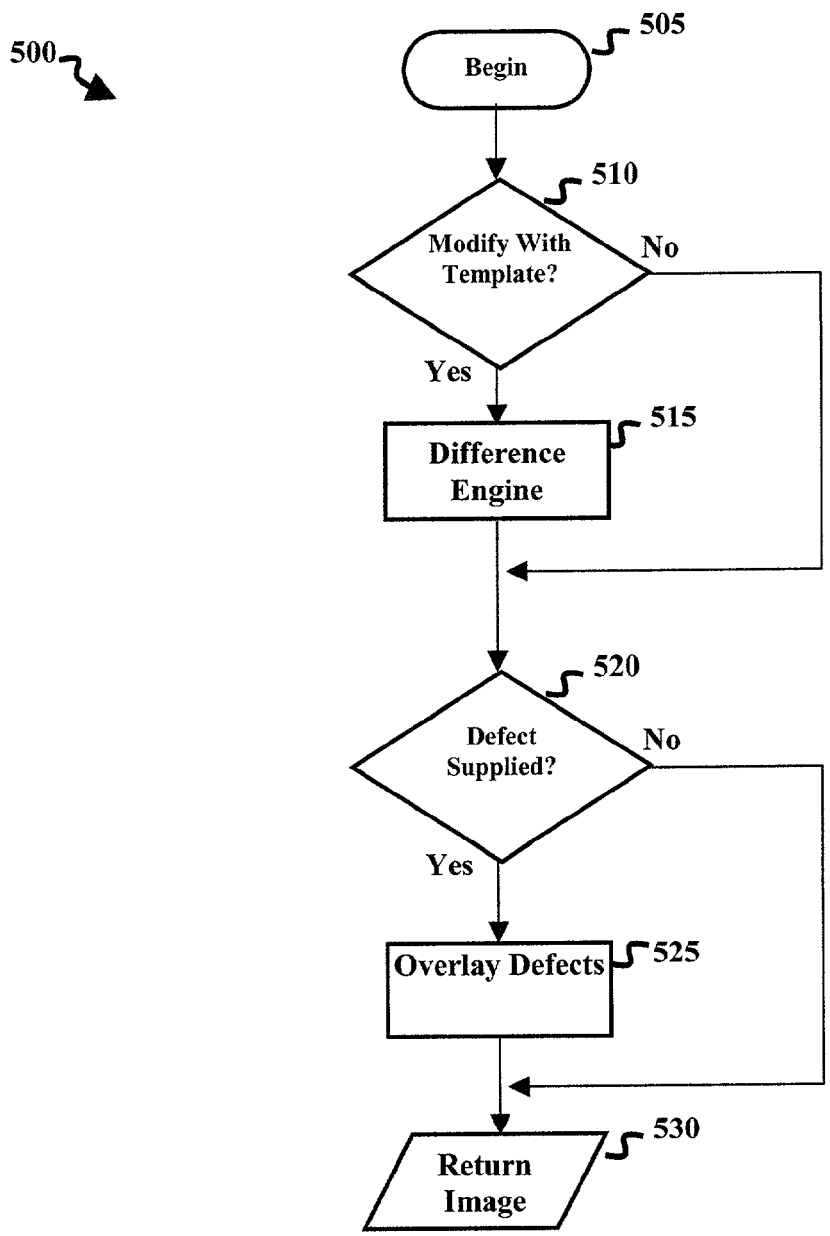
FIG. 5 is a flow chart illustrating a method according to the invention describing how the formatter combines information from the composite image, optional template image, and optional defect information.

FIG. 5 is a flow chart illustrating a method 500 according to the invention for describing how the formatter 135 computes the display image from a composite image and an optional template image. The process of computing the displayed image begins in step 505. This will be initiated when a new composite image 115 is available. In step 510, a check is made to see if template image 125 is available. The template image 125 is supplied by the image inspection system, or can be computed automatically by averaging a large number of images 105, preferably without defects. Template image 125 is already aligned and normalized as necessary to allow a direct comparison with the composite image 115. If a template image is specified and the system is configured to use this image, step 515 will compare the composite image with the template image. In the preferred embodiment, this comparison is accomplished with a difference operator in one of two configurations. In the first configuration, an image is computed by taking the absolute value of the difference between every pixel in the composite image with the equivalent pixel in the template image. This difference image will highlight any areas that differ greatly between the composite image and template image. In the second configuration, the display image is computed by taking the difference between every pixel in the composite image with the equivalent pixel in the template image. Instead of an absolute value operation, a constant value is added to this difference image, allowing the visual image to show whether missing features or additional features are responsible for the defects.

In step 520, a check is made to see if defect information is supplied by the image inspection system. This defect information 130 can be supplied as textual information, coordinates, or regions describing where defects are present in the images 105. If defect information is available, step 525 will overlay the defect information on the display image. There is a one to one correspondence between images 105 and defects 130 so the overlay process must handle defect information from each image. If the composite image produced by combiner 110 involved an alignment step, any coordinate information supplied by defects 130 must also be transformed using the same coordinate transformations applied to images 105. In the preferred embodiment of the invention, the defect information from defects 130*a*, 130*b*, and 130*c* are overlaid on the display image using a fixed color multiplied by the relative weights used by the summer 250 to compute the original composite image 115. Textual information supplied by defect 130 will be displayed if space is available. In the preferred embodiment, these messages are displayed in a scrolling window such that the information from a single defect, such as defect 130*a*, will not obscure the messages from any other defect.

In step 530, the display image is returned such that it can be shown on a video display or archived for later display and analysis.

We claim:

1. A method for computing a digital image to visually highlight and persist the location of defects, comprising the steps of:
   a. accepting a number of digital images from an image analysis system or image database,
   b. performing alignment and normalization on said images, as required, to register the images with respect to each other, c. computing a composite image from said images to enhance any defects found in the input images, as well as cause the visual persistence of these defects in the composite image, where the persistence of the defects depends on the number of images in said computing step and a weighing function, d. formatting said composite image with additional annotations for display.

2. A method according to claim 1, wherein the step of accepting digital images is not limited to looking at every image available, but only those images which meet some criteria.

3. A method according to claim 1, wherein the step of performing alignment and normalization comprises:
   a. performing zero or more image processing steps to help highlight defects in the image.
   b. translating each image, if necessary, to align the objects,
   c. performing a six degree-of-freedom alignment if a translation only alignment is not sufficient to allow the sequence of images to be aligned,
   d. normalizing each image to compensate for variations in brightness, contrast and color,
   e. optionally reducing the pixel depth of each aligned image,
   f. storing the transformed images in a queue to enhance performance,
   g. combining the aligned images into a single composite image.

4. A method according to claim 3, wherein the step of applying image processing comprises:
   a. applying zero or more sequential steps of image processing to an image,
   b. selecting an image processing algorithm for tuning the system to detect certain kinds of defects,
   c. changing the image processing steps or parameters in realtime until the desired amount of image processing has been achieved.

5. A method according to claim 1, wherein the step of computing the composite image comprises:
   a. applying an arbitrary algorithm, pixel-by-pixel, on the aligned images, to produce a single output image,
   b. optionally including information from previously computed composite images,
   c. constructing the composite image such that the information from the aligned images is either overlaid or offset from each other.

6. A method according to claim 1, wherein the step of formatting the composite image comprises:
   a. modifying the composite image with a template image, supplied by the analysis equipment or computed locally, to highlight differences between the composite image and template image,
   b. annotating the composite image with graphics or textual results obtained from the image analysis equipment.

7. A method according to claim 6, wherein the step of annotating the composite image is done such that the graphics are altered with the same transformations as applied to align the images, and any textual information is combined from all input images and displayed.

8. A system for computing a digital image to visually highlight and persist the location of defects, comprising:
   a. a processor receiving a number of digital images each having optional defect or status information,
   b. a processor performing alignment and normalization on said images to register the images with respect to each other,
   c. a processor computing a composite image from said images to enhance any defects found in the input images, as well as cause the visual persistence of defects in the composite image, where the persistence of the defects depends on the number of images in said computing step and a weighing function,
   d. a processor formatting said composite image with additional annotations for display.

9. A system according to claim 8, wherein the processor prepares each image by first applying zero or more image processing steps to help highlight defects followed by alignment and normalization steps.

10. A system according to claim 8, wherein the processor computes a composite image by combining information from each input image, pixel-by-pixel, such that the composite image will visually show defects from one or more of the input images.

11. A system according to claim 8, wherein the processor computes a displayable image by finding the difference between a template image, if any, and the composite image and by combining this image with any available defect or status information, in both graphical and textual form.

12. A method for computing a digital image to visually highlight and persist the location of defects, comprising the steps of:
   a. accepting a number of digital images from an image analysis system or image database, whereby each digital image represents a different, identically manufactured or created object, b. peforming alignment and normalization on said images, as required, to register the images with respect to each other, c. computing a composite image from said images to enhance any defects found in the input images, as well as cause the visual persistence of these defects in the composite image,where the persistence of the defects depends on the number of images in said computing step and a weighing function,
   d. formatting said composite image with additional annotations for display.

13. A method according to claim 12, wherein the step of accepting digital images is not limited to looking at every image available, but only those images which meet some criteria.

14. A method according to claim 12, wherein the step of performing alignment and normalization comprises:
   a. performing zero or more image processing steps to help highlight defects in the image.
   b. translating each image, if necessary, to align the objects,
   c. performing a six degree-of-freedom alignment if a translation only alignment is not sufficient to allow the sequence of images to be aligned,
   d. normalizing each image to compensate for variations in brightness, contrast and color,
   e. optionally reducing the pixel depth of each aligned image,
   f. storing the transformed images in a queue to enhance performance,
   g. combining the aligned images into a single composite image.

15. A method according to claim 14, wherein the step of applying image processing comprises:
   a. applying zero or more sequential steps of image processing to an image, b. selecting an image processing algorithm for tuning the system to detect certain kinds of defects, c. changing the image processing steps or parameters in realtime until the desired amount of image processing has been achieved.

16. A method according to claim 12, wherein the step of computing the composite image comprises:

a. applying an arbitrary algorithm, pixel-by-pixel, on the aligned images, to produce a single output image, b. optionally including information from previously computed composite images, c. constructing the composite image such that the information from the aligned images is either overlaid or offset from each other.

17. A method according to claim 12, wherein the step of formatting the composite image comprises:

a. modifying the composite image with a template image, supplied by the analysis equipment or computed locally, to highlight differences between the composite image and template image, b. annotating the composite image with graphics or textual results obtained from the image analysis equipment.

18. A method according to claim 17, wherein the step of annotating the composite image is done such that the graphics are altered with the same transformations as applied to align the images, and any textual information is combined from all input images and displayed.

19. A system for computing a digital image to visually highlight and persist the location of defects, comprising:

a. a processor receiving a number of digital images each having optional defect or status information, whereby each digital image represents a different, identically manufactured or created object, b. a processor performing alignment and normalization on said images to register the images with respect to each other, c. a processor computing a composite image from said images to enhance any defects found in the input images, as well as cause the visual persistence of defects in the composite image, where the persistence of the defects depends on the number of images in said computing step and a weighing function, d. a processor formatting said composite image with additional annotations for display.

20. A system according to claim 19, wherein the processor prepares each image by first applying zero or more image processing steps to help highlight defects followed by alignment and normalization steps.

21. A system according to claim 19, wherein the processor computes a composite image by combining information from each input image, pixel-by-pixel, such that the composite image will visually show defects from one or more of the input images.

22. A system according to claim 19, wherein the processor computes a displayable image by finding the difference between a template image, if any, and the composite image and by combining this image with any available defect or status information, in both graphical and textual form.

* * * * *